United States Patent [19]

Macchi

[11] Patent Number: 4,677,774

[45] Date of Patent: Jul. 7, 1987

[54] VALVE ASSEMBLY STRUCTURE FOR STEAM FLATIRONS

[76] Inventor: Ercole Macchi, Via G. Agnesi, 5-Milano, Italy

[21] Appl. No.: 799,533

[22] Filed: Nov. 18, 1985

[30] Foreign Application Priority Data

Nov. 22, 1984 [IT] Italy ............................... 23859/84[U]

[51] Int. Cl.$^4$ .................. F16K 1/46; D06F 75/06; D06F 75/20

[52] U.S. Cl. .................................. 38/77.83; 38/77.7; 251/322; 251/214; 251/245

[58] Field of Search ............... 251/323, 322, 321, 214, 251/245; 38/77.5, 77.9, 77.7, 77.83

[56] References Cited

U.S. PATENT DOCUMENTS

| | | | |
|---|---|---|---|
| 1,198,956 | 9/1916 | Richardson et al. | 251/323 X |
| 2,105,487 | 1/1938 | Lozon | 251/323 X |
| 2,673,918 | 3/1954 | Lawton | 251/245 X |
| 2,680,312 | 6/1954 | Parr | 38/77.83 |
| 3,815,872 | 6/1974 | Dunn | 251/323 |

*Primary Examiner*—Arnold Rosenthal
*Attorney, Agent, or Firm*—Guido Modiano; Albert Josif

[57] ABSTRACT

The valve assembly comprises a first ring nut for attachment to the wall delimiting the steam chamber outwardly and a second ring nut for attachment to the partition wall between the steam chamber and steam delivery chamber. Also provided is a shutter rod accessible from the outside and being passed axially through the cited ring nuts. The shutter rod carries first and second seals which movably control the communication of the steam chamber with the steam delivery chamber, respectively, as well as the tightness of the steam chamber toward the outside.

10 Claims, 3 Drawing Figures

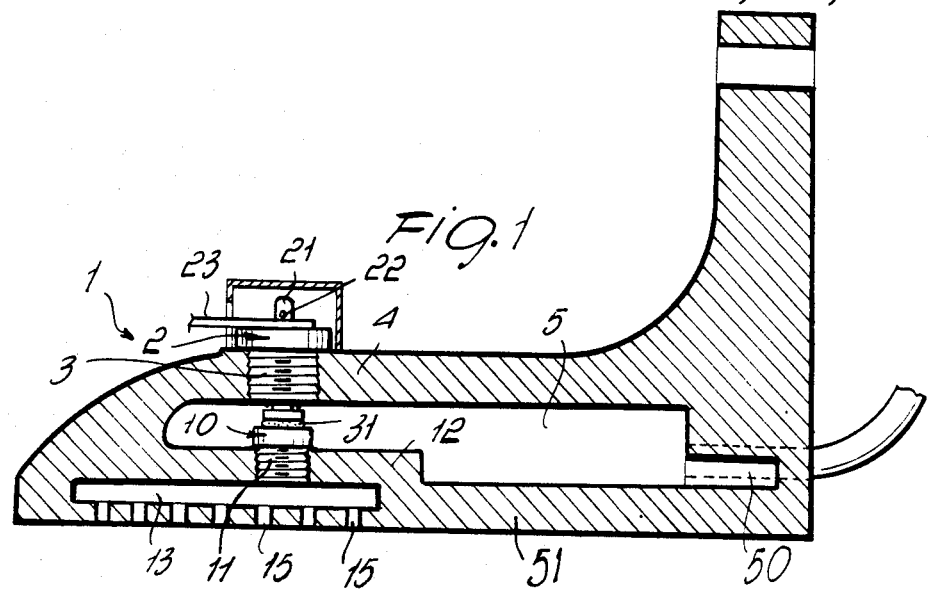
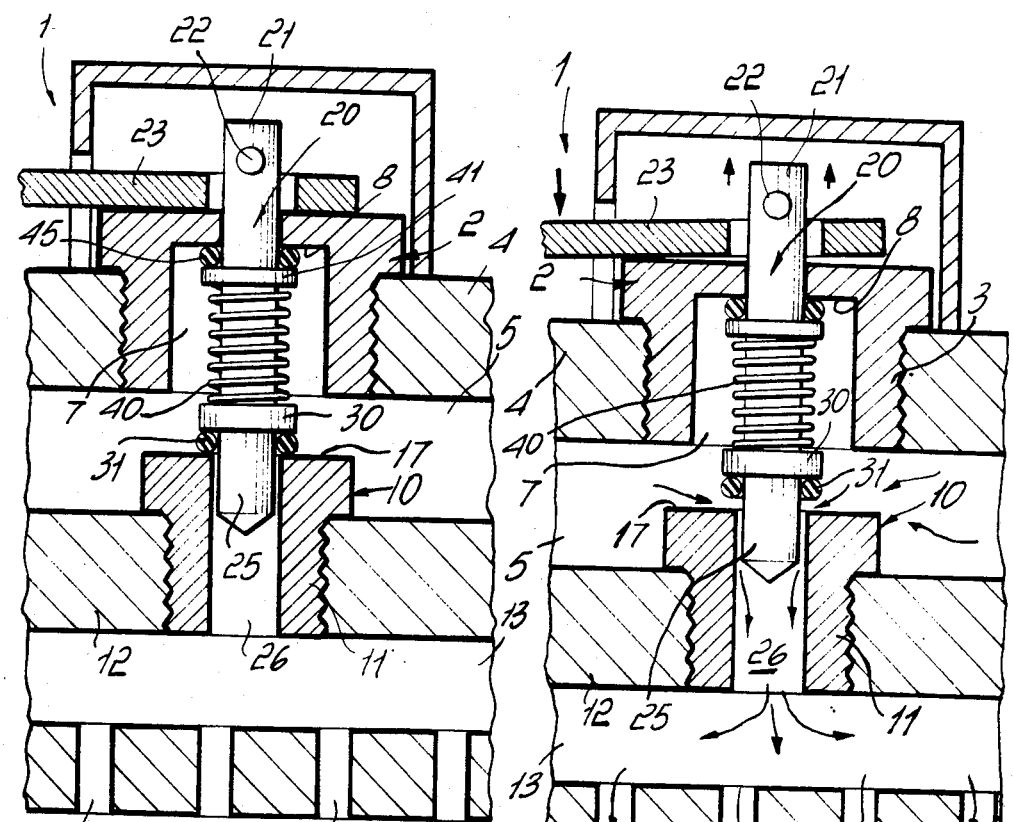

VALVE ASSEMBLY STRUCTURE FOR STEAM FLATIRONS

BACKGROUND OF THE INVENTION

This invention relates to a valve assembly structure for steam flatirons.

As is known, currently available steam flatirons of the professional kind comprise an internal steam chamber which is in communication with a pressure steam generator and is communicated, through intervening valve means, with a delivery chamber for the steam jet to be directed to a fabric being ironed.

Such flatirons have no internal heat source and are heated by the steam itself which is supplied in large amounts by the steam generator and can be delivered to clothing being ironed at a high rate.

Flatirons of that type must be currently provided with a valve assembly, of course, adapted for operation from the outside, generally in the proximity of the flatiron handgrip, thereby a tight seal toward the outside must be provided at the area where the control handle or rod is passed, and a shutter must be provided to control the communication of the steam chamber with the steam delivery chamber.

Valve assemblies currently in use tend to be highly complex in the construction of the sealing arrangement, and require highly complex machining for properly accommodating the valve body.

Another drawback of the prior approaches is that prior valve assemblies generally cannot afford a high rate of steam delivery because, due to constructional reasons, the valve body must be provided with steam passage holes which are relatively small, and condensation occurs in the valve body.

SUMMARY OF THE INVENTION

It is the aim of this invention to obviate such prior drawbacks by providing a new type of valve assembly purposely designed for steam flatirons which can, in the first place, allow all the valve body assembling and servicing operations to be greatly simplified, while drastically simplified is the construction of the valve body.

Within the above aim, it is a particular object of this invention to provide a valve assembly for steam flatirons which requires no special maintenance and can deliver dry steam at a high rate, since no condensation can take place within the valve body.

A further object of this invention is to provide a valve assembly which, while being structurally simple, can give full assurance of being reliable and safe to use.

A not least object of this invention is to provide a valve assembly structure which can be readily formed from commercially available elements, and is competitive in cost.

The above aim, and these and other objects to become apparent hereinafter are achieved by a valve assembly structure for steam flatirons, according to the invention, characterized in that it comprises a first ring nut for attachment to the wall delimiting the steam chamber toward the outside and a second ring nut for attachment to the partition wall between said steam chamber and the steam delivery chamber, a shutter rod accessible from the outside and passed axially through said ring nuts being also provided, said shutter rod carrying first and second seals, respectively, for movably controlling the communication of said steam chamber with said steam delivery chamber and for sealing said steam chamber from the outside.

BRIEF DESCRIPTION OF THE DRAWINGS

Further features and advantages will be apparent from the following detailed description of a valve assembly structure for steam flatirons, according to the invention, as shown by way of illustration and not of limitation in the accompanying drawing, where:

FIG. 1 shows diagramatically a steam flatiron incorporating the valve assembly of this invention;

FIG. 2 is an enlarged scale sectional view of the valve assembly in the closed position thereof; and FIG. 3 is a sectional view of the valve assembly shown in its open position, that is, in its steam delivering condition.

DESCRIPTION OF THE PREFERRED EMBODIMENTS

With reference to the drawing figures, the valve assembly structure for steam flatirons, according to the invention, which is generally designated with the reference numeral 1, has a first ring nut 2 provided with a body 3 which may be threaded to a delimiting wall 4 delimiting the steam chamber 5 toward the outside, in turn communicating with a conventional steam generator, not shown in the drawing figures through steam inlet means 50. In particular, as visible from the drawing, the delimiting wall 4 has a threaded aperture extending therethrough between the steam chamber 5 and the outside for accommodating therein the first ring nut 2.

The ring nut 2 defines on its interior a cavity 7 having a flat ceiling or bottom 8 and being axially aligned with a first through hole.

Coaxial and in alignment with the first ring nut 2 there is provided a second ring nut 10 having an outside threaded body 11 which engages in the intermediate wall 12 for communication between the steam chamber 5 and the steam delivery chamber 13 which is provided as usual with steam delivery holes 15 through the bottom wall 51 which delimits at the bottom the flatiron inside with respect to the outside. As for the delimiting wall 4, the intermediate wall 12 has a through aperture engaging with the second ring nut 10. As visible from the drawings both ring nuts have a threaded portion, engaging with the respective apertures in the walls 4 and 12 and an enlarged portion for abutting against the wall 4 on the flatiron outside and the wall 12 in the steam chamber 5, respectively.

The second ring nut 10 defines at the top a flat ledge surface indicated at 17.

For fast assembling, the head of the second ring nut 10 has a smaller diameter than the body of the first ring nut 2, thereby, once the housing holes have been formed, both ring nuts may be assembled to the flatiron simply and conveniently.

Inside the ring nuts 2 and 10 there is passed an axially movable valve stem 20 which is accessible from the outside, that is, at the top portion of the first ring nut 2 where it has a head tang 21 accommodating a stop or cross-pin 22 engageable by a yoke element or the like, indicated at 23, which enables the rod to be operated, i.e. moved in the axial direction.

At the other end, the stem 20 has a tip 25 which is received in the through hole 26 defined by the second ring nut 10 and axially aligned with the first through hole in the first ring nut 2.

At a middle portion of the stem 20, there is provided a flange boss 30 below which there is carried a first seal formed of a first annular seal 31 of round cross-section adapted to abut against the ledge 17 of the second ring nut 10 to control the communication between the steam chamber 5 and steam delivery chamber 13.

At the top portion of the flange boss 30 there act elastic means comprising a coil spring 40 which acts with the other end on a washer 41 set slidable with respect to the stem 20 and acting by contact on a second seal comprising a second annular seal 45 of round cross-section which is biased elastically against the ceiling 8 of the the first ring nut 2 to effect a tight closure of the steam chamber 5 toward the outside.

As shown in FIG. 2, in the closed position, i.e. when no steam is being delivered, the first seal 30 is pressed against the ledge surface 17 defined by the ring nut and the second seal 45 is urged by the washer 41, through the spring 40, against the ceiling 8, thereby a perfectly tight seal is provided it being evident that nuts 2 and 10 are in tight screw thread engagement with walls 4 and 12, respectively.

When steam is to be delivered, it will be sufficient to act on the handle or rod 23 to produce an upward movement of the stem, that is, its axial translation against the spring 40, thereby the seal 31 moves away from the ledge surface 17 and allows steam to flow from the steam chamber 5 into the steam delivery chamber 13 through the annular zone provided between the tip 25 and hole 26.

On effecting this operation, the washer 41 will slide with respect to the stem 20, while retaining a perfect seal of the chamber 5 toward the outside.

On releasing the handle 23, the spring 40 will push the first annular seal elastically back against the ledge surface 17, thus sealing tight the communication between the steam chamber 5 and steam delivery chamber 13.

It may be appreciated from the foregoing that the invention achieves its objects, and in particular, that the valve assembly of this invention affords an accurate and perfect seal of the steam chamber toward the outside and of the communication between the steam chamber and steam delivery chamber, using extremely simple means which are quick to install on a flatiron, without involving any particular machining, since it will be sufficient to form the two threaded seats for coupling the first and second ring nuts.

Further, by not having complex parts, the valve assembly is less liable to jam or clog, and can be easily and quickly disassembled for maintenance, since it will be sufficient to thread the ring nuts out. It should also be noted that the second ring nut could comprise a through hole 26 formed in the wall 12 and the ledge surface 17 could be a machine surface on the wall 12.

In practicing the invention, the materials used, so long as compatible with their application, and the dimensions and contingent shapes may be any ones according to necessity.

I claim:

1. In a steam flatiron having an upper delimiting wall and a bottom wall connected to each other and defining therebetween a flatiron inside cavity with a main steam chamber and a steam delivery chamber, said flatiron further having an intermediate wall extending in said flatiron inside cavity between said upper delimiting wall and said bottom wall and separating therein a main steam chamber from a delivery steam chamber facing said bottom wall, said main steam chamber having steam inlet means, said bottom wall defining a plurality of steam delivery holes communicating said steam delivery chamber with the outside, said upper delimiting wall having a first threaded aperture extending therethrough providing communication between said main steam chamber and the outside, said intermediate wall having a second threaded aperture extending therethrough between said main steam chamber and said steam delivery chamber in alignment with said first threaded aperture, a valve assembly including:

a first ring nut having an outwardly threaded portion for tight screw thread engagement with said first threaded aperture and a first enlarged portion for abutting against said upper delimiting wall at said flatiron outside, said ring nut defining an axial cavity having a cavity ceiling with a first through-hole extending through said first enlarged portion;

a second ring nut having an outwardly threaded portion for tight screw thread engagement with said second threaded aperture and a second enlarged portion for abutting against said intermediate wall in said main steam chamber and extending at a distance from said first ring nut, said second ring nut defining a second through-hole extending axially through said second ring nut for axial alignment with said first through hole;

a valve stem extending through said first threaded aperture, said axial cavity and said main steam chamber and having a tip at least partially extending in said second through-hole, and a head tang protruding from said first threaded aperture toward the flatiron outside, said valve stem defining near said tip an annular flange boss and at said head tang an actuation cross-pin;

a washer extending around said valve stem between said cavity ceiling and said flange boss;

a first annular seal extending around said valve stem between said washer and said cavity ceiling;

a second annular seal extending around said valve stem between said boss flange and said tip, and a spring means extending around said valve stem between said washer and said flange boss for pushing said washer and said first annular seal against said cavity ceiling and said flange boss and said second annular seal against said second enlarged portion of said second ring nut.

2. A valve assembly according to claim 1, wherein said first and second annular seal have a round cross-section.

3. A valve assembly according to claim 1, wherein said enlarged portion of said second ring nut has a diameter smaller than said threaded portion of said first ring nut.

4. A valve assembly according to claim 1, wherein said second enlarged portion of said second ring nut has a face facing towards said main steam chamber, said face faing flat for engagement with said second annular seal.

5. In a steam flatiron having an upper delimiting wall and a bottom wall connected to each other and defining therebetween a flatiron inside cavity with a main steam chamber and a steam delivery chamber, said flatiron further having an intermediate wall extending in said flatiron inside cavity between said upper delimiting wall and said bottom wall and separating therein a main steam chamber from a delivery steam chamber facing said bottom wall, said main steam chamber having steam inlet means, said bottom wall defining a plurality of steam delivery holes communicating said steam delivery chamber with the outside, said upper delimiting wall having a first threaded aperture extending therethrough providing communication between said main steam chamber and the outside, said intermediate wall having a second threaded aperture extending therethrough between said main steam chamber and said steam delivery chamber in alignment with said first threaded aperture, a valve assembly including:
- a first ring nut having an outwardly threaded portion for tight screw thread engagement with said first threaded aperture and a first enlarged portion for abutting against said delimiting wall at said flatiron outside, said threaded portion defining an axial cavity having a cavity ceiling with a first through-hole extending through said first enlarged portion;
- a second ring nut having an outwardly threaded portion for tight screw thread engagement with said second threaded aperture and second enlarged portion for abutting against said intermediate wall in said main steam chamber and extending at a distance from said first ring nut, said second ring nut defining a second through-hole extending axially in said second ring nut for axial alignment with said first through-hole, said second enlarged portion of said second ring nut having a diameter smaller than said threaded portion of said first ring nut and defining a flat face, facing said main steam chamber;
- a valve stem extending through said first threaded aperture, said axial cavity and said main steam chamber and having a tip at least partially extending in said second through-hole, and a head tang protruding from said first threaded aperture toward the flatiron outside, said valve stem defining near said tip an annular flange boss and at said head tang an actuation cross-pin;
- a washer extending around said valve stem between said cavity ceiling and said flange boss;
- a first annular seal of round cross-section extending around said valve stem between said washer and said cavity ceiling;
- a second annular seal of round cross-section extending around said valve stem between said flange boss and said tip and sealingly acting on said flat face, and
- a spring means extending around said valve stem between said washer and said flange boss for pushing said washer and said first annular seal against said cavity ceiling and said flange boss and said second annular seal against said flat face.

6. A steam flatiron having an upper delimiting wall and a bottom wall connected to each other and defining therebetween a flatiron inside cavity with a main steam chamber and a steam delivery chamber, said flatiron further having an intermediate wall extending in said flatiron inside cavity between said upper delimiting wall and said bottom wall and separating therein a main steam chamber from a delivery steam chamber facing said bottom wall, said main steam chamber having steam inlet means, said bottom wall defining a plurality of steam delivery holes communicating said steam delivery chamber with the outside, said upper delimiting wall having a first threaded aperture extending therethrough providing communication between said main steam chamber and the outside, said intermediate wall having a second threaded aperture extending therethrough between said main steam chamber and said steam delivery chamber in alignment with said first threaded aperture, a valve assembly including: a first ring nut having an outwardly threaded portion in tight screw thread engagement with said first threaded aperture and a first enlarged portion abutting against said delimiting wall at the flatiron outside, said threaded portion defining an axial cavity having a cavity ceiling with a first through-hole extending in said first enlarged portion, a second ring nut having an outwardly threaded portion in tight screw thread engagement with said second threaded aperture and a second enlarged portion abutting against said intermediate wall in said main steam chamber and extending at a distance from said first ring nut, said second ring nut defining a second through-hole extending axially in said second ring nut and being axially aligned with said first through-hole, a valve stem extending through said first threaded aperture, said axial cavity and said main steam chamber and having a tip at least partially extending in said second through-hole, and a head tang protruding from said first threaded aperture toward the flatiron outside, said valve stem defining near said tip an annular flange boss and at said head tang an actuation cross-pin, a washer extending around said valve stem between said cavity ceiling and said flange boss, a first annular seal extending around said valve stem between said washer and said cavity ceiling a second annular seal extending around said valve stem between said boss flange and said second ring nut, and a spring means extending around said valve stem between said washer and said flange boss and pushing said washer and said first annular seal against said cavity ceiling and said flange boss and said second annular seal against said second enlarged portion of said second ring nut.

7. A steam flatiron according to claim 6, wherein said first and second annular seal have round cross-sections.

8. A steam flatiron according to claim 6, wherein said second enlarged portion of said second ring nut has a diameter smaller than said threaded portion of said first ring nut.

9. A steam flatiron according to claim 6, wherein said second enlarged portion of said second ring nut has a flat face facing towards said main steam chamber.

10. A steam flatiron according to claim 6, wherein said ring nuts are in tight screw thread engagement with said first and second apertures independently from each other.

* * * * *